Figure 1:
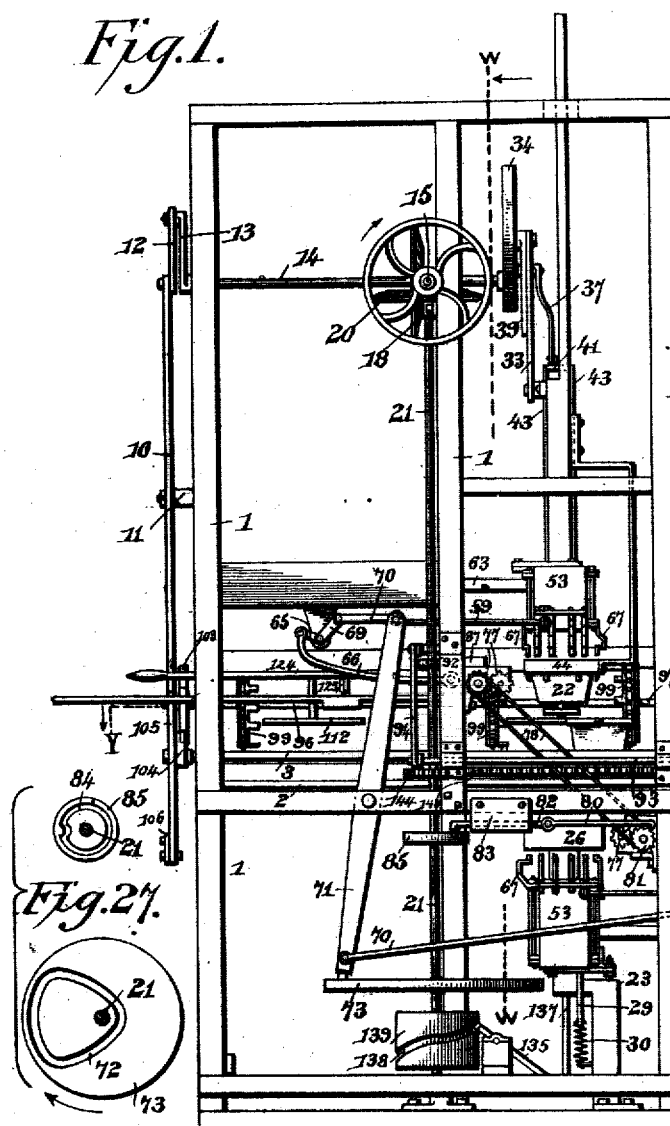

No. 814,333. PATENTED MAR. 6, 1906.
H. W. SUMMER.
BOX MACHINE.
APPLICATION FILED MAY 3, 1897.

9 SHEETS—SHEET 1.

Witnesses
Jas. K. McCathran
V. B. Hillyard.

Inventor
Henry W. Summer
By his Attorneys,
C. A. Snow & Co.

No. 814,333. PATENTED MAR. 6, 1906.
H. W. SUMMER.
BOX MACHINE.
APPLICATION FILED MAY 3, 1897.
9 SHEETS—SHEET 2.
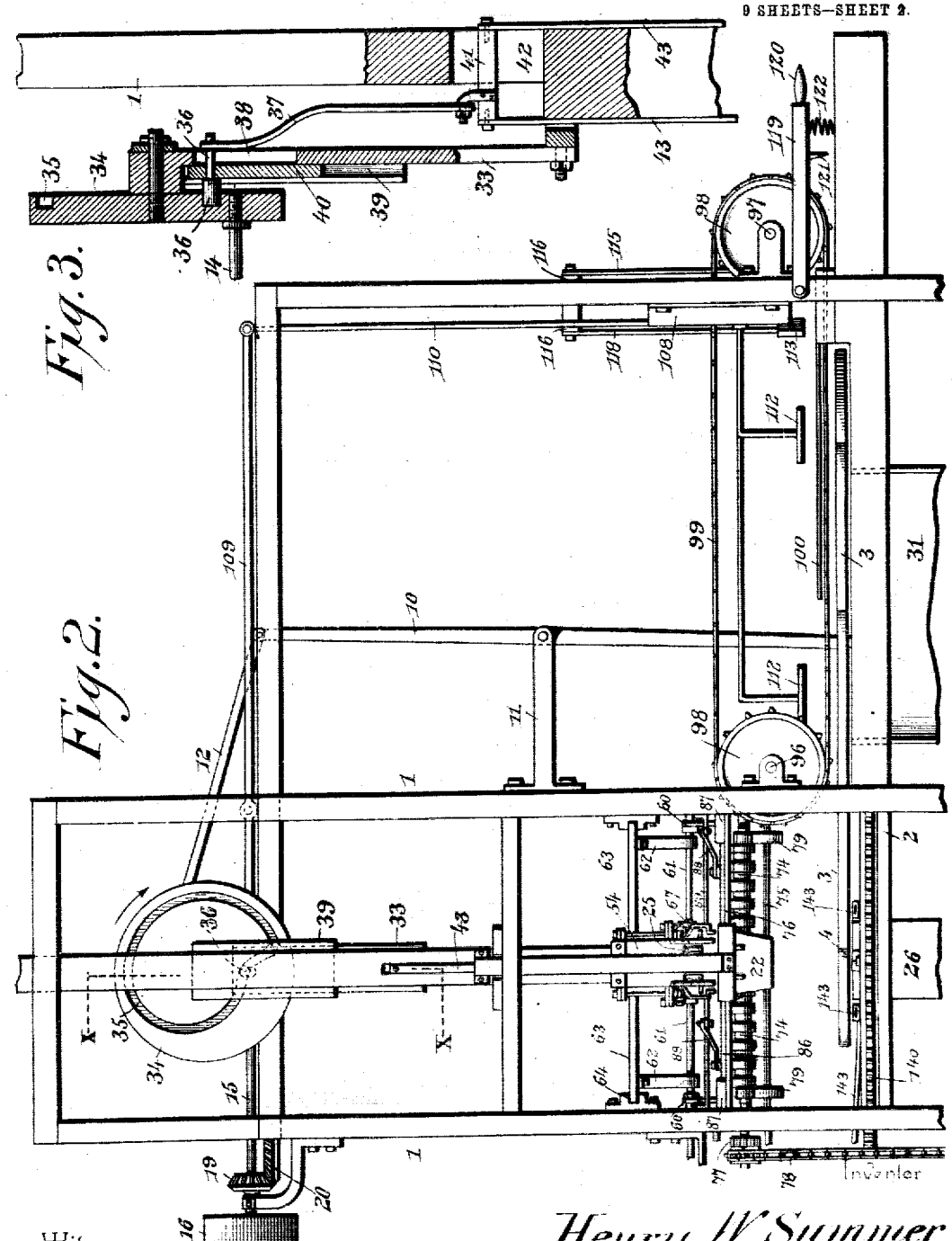
Witnesses
Henry W. Summer
By his Attorneys, No. 814,333.  
PATENTED MAR. 6, 1906.  
H. W. SUMMER.  
BOX MACHINE.  
APPLICATION FILED MAY 3, 1897.  
9 SHEETS—SHEET 3.

Witnesses  
Jas. K. McCathran  
V. B. Hillyard

Inventor  
Henry W. Summer  
By his Attorneys,  
C. A. Snow & Co.

No. 814,333.   PATENTED MAR. 6, 1906.
H. W. SUMMER.
BOX MACHINE.
APPLICATION FILED MAY 3, 1897.

9 SHEETS—SHEET 4.

Witnesses
Jas. K. McCathran
V. B. Hillyard.

Inventor
Henry W. Summer
By his Attorneys,
C. A. Snow & Co.

No. 814,333. PATENTED MAR. 6, 1906.
H. W. SUMMER.
BOX MACHINE.
APPLICATION FILED MAY 3, 1897.

9 SHEETS—SHEET 5.

Witnesses
Jas. K. McCathran
V. B. Hillyard

Inventor
Henry W. Summer
By his Attorneys,
C. A. Snow & Co.

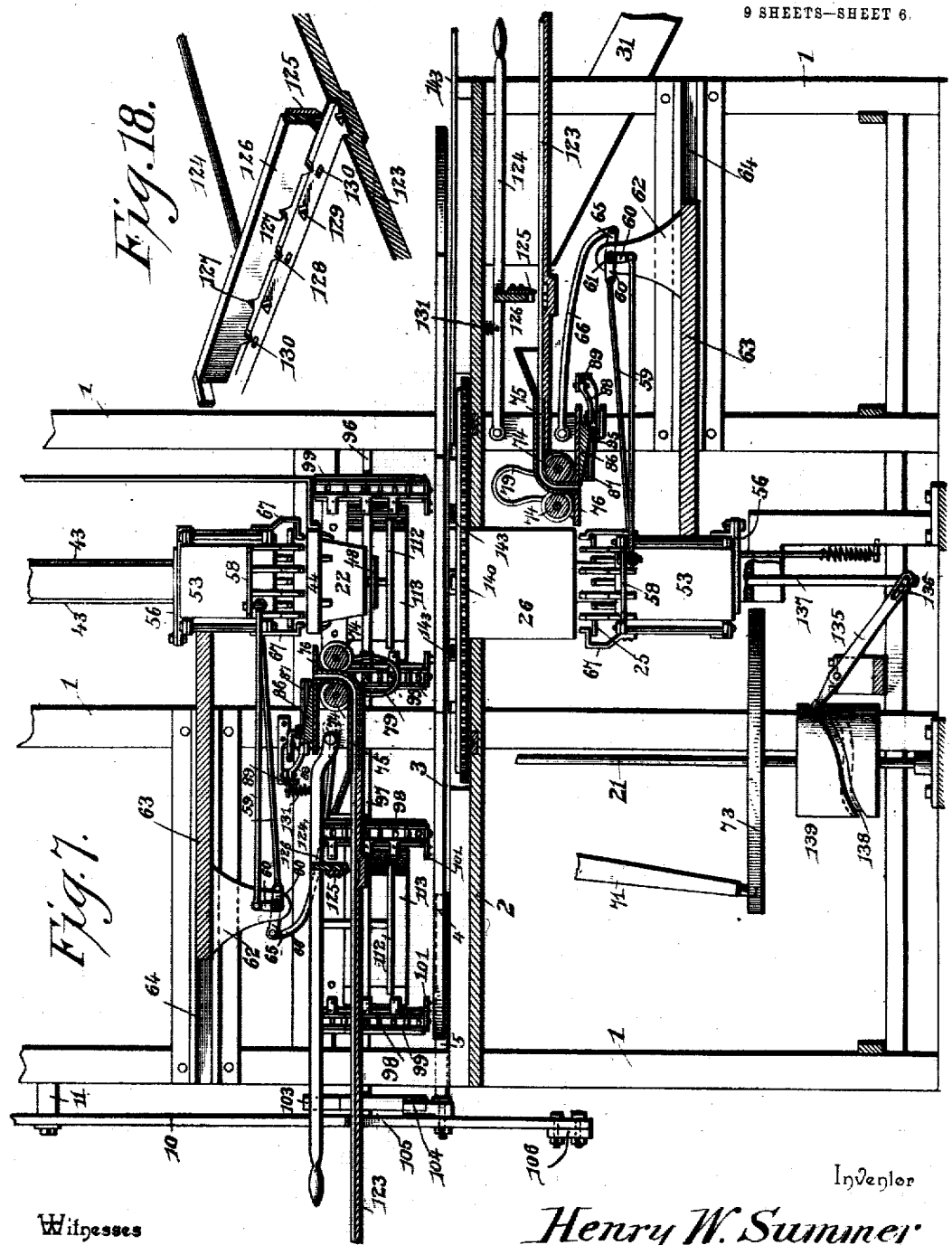

No. 814,333. PATENTED MAR. 6, 1906.
H. W. SUMMER.
BOX MACHINE.
APPLICATION FILED MAY 3, 1897.
9 SHEETS—SHEET 7.
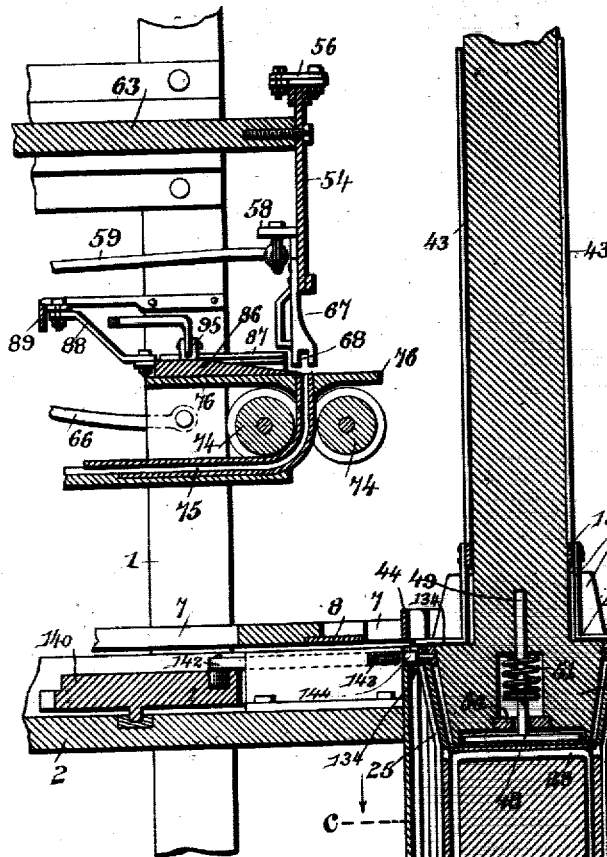
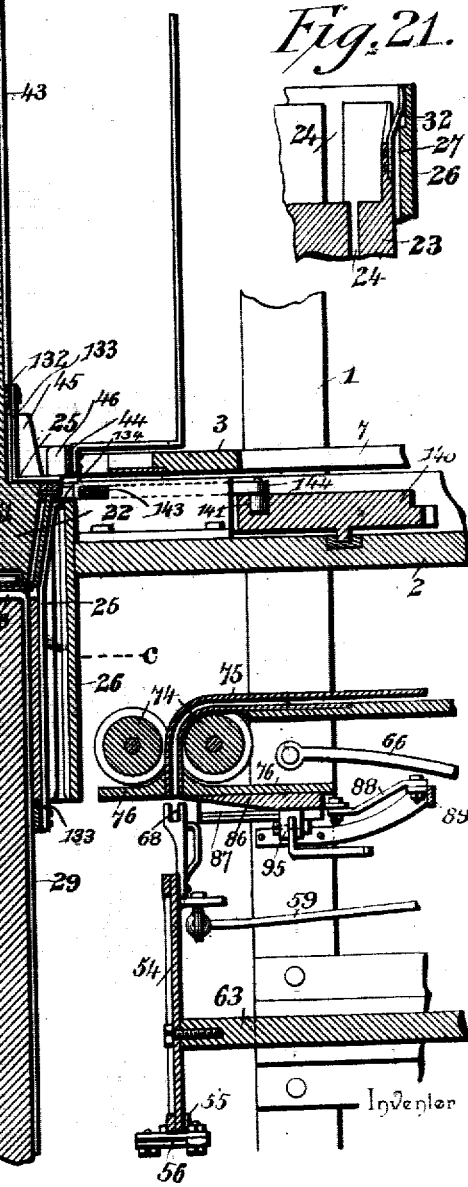
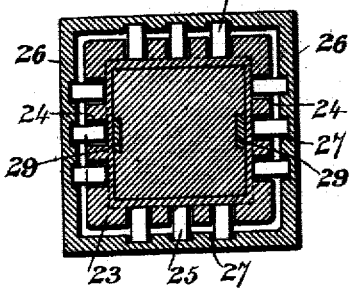
Witnesses
Jas. K. McCathran
V. B. Hillyard
By his Attorneys,
C. A. Snow & Co.
Inventor
Henry W. Summer

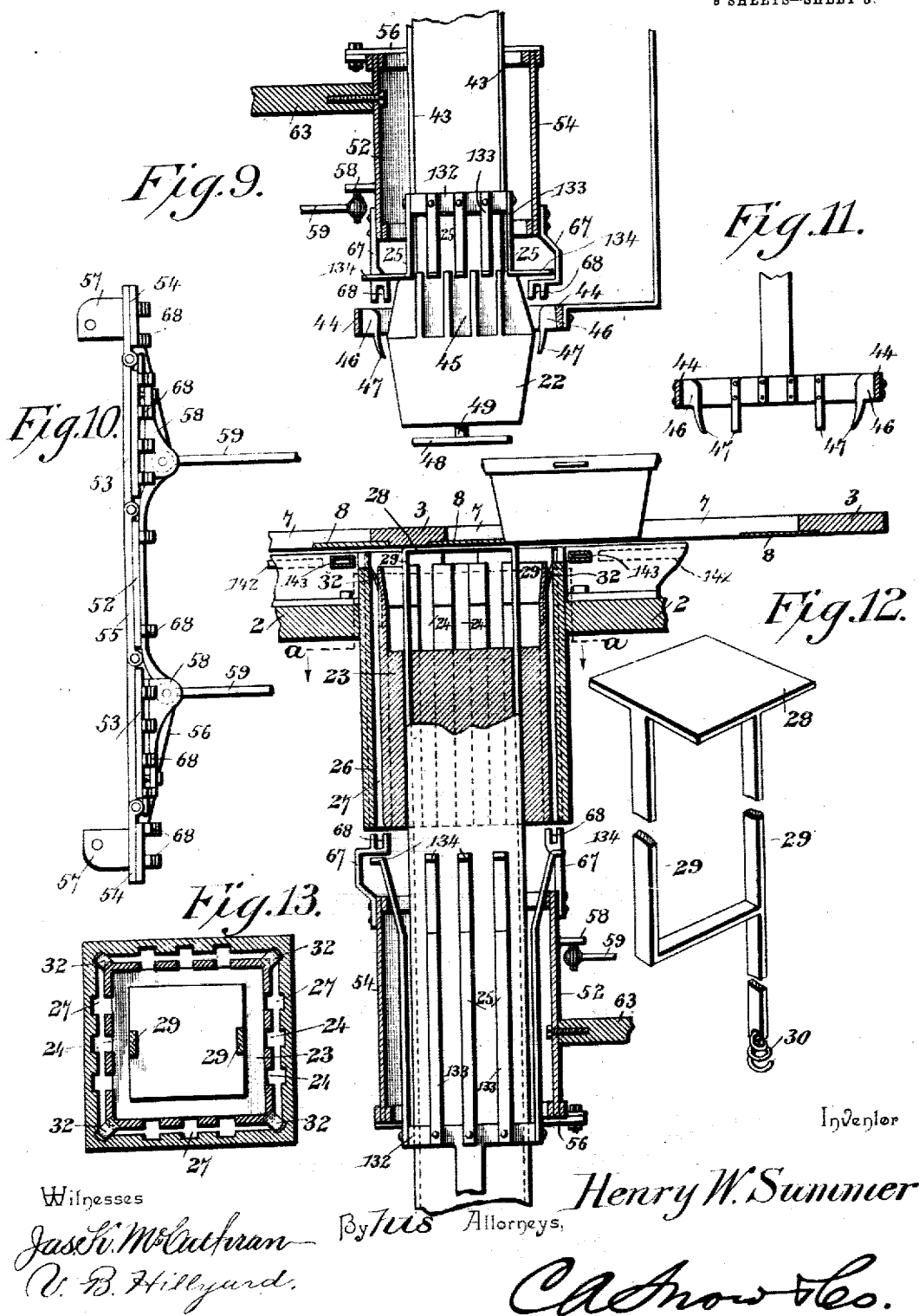

No. 814,333. PATENTED MAR. 6, 1906.
H. W. SUMMER.
BOX MACHINE.
APPLICATION FILED MAY 3, 1897.

9 SHEETS—SHEET 9.

Witnesses
Jas. K. McCathran
V. B. Hillyard

Inventor
Henry W. Summer
By his Attorneys,
C. A. Snow & Co.

UNITED STATES PATENT OFFICE.

HENRY W. SUMMER, OF EAST ROCHESTER, OHIO.

BOX-MACHINE.

No. 814,333.　　　Specification of Letters Patent.　　　Patented March 6, 1906.

Application filed May 3, 1897. Serial No. 634,935.

*To all whom it may concern:*

Be it known that I, HENRY W. SUMMER, a citizen of the United States, residing at East Rochester, in the county of Columbiana and State of Ohio, have invented a new and useful Box-Machine, of which the following is a specification.

This invention relates to a novel machine for the manufacture of receptacles of that class which are formed of veneering or other sheet material.

More particularly, the invention comprehends a machine for producing rapidly and without unnecessary waste of material those receptacles or packages designed for the reception of berries and known in the art as "berry baskets or packages." In the construction of these berry-baskets a pair of rectangular body-forming blanks of veneering are placed in crossing relation between a form and die and are bent around the form to assume the shape of the basket desired. The basket-body thus formed is provided with one or more bands extending around the upper edges of the blanks and secured thereto—as, for instance, by staples or other uniting devices.

The general object of this invention is to provide mechanism for transforming sheets of veneering into complete receptacles ready for the market with the greatest possible speed and economy; but subordinate to this general object are others, certain of which may be enumerated in this introductory part of the specification, though many of which being of less importance will not be specifically recited, but will appear during the course of the succeeding description.

One of the objects of the invention is to provide a machine which in addition to the formation of a box or receptacle from blanks and bands will sever these component parts of the basket from sheets of veneering and automatically assemble the severed parts in properly-ordered position to be acted upon by the shaping and uniting devices.

A further object of the invention is to provide mechanism for feeding and delivering the body-forming blanks or the bottom and sides forming blanks to the blank-bending mechanism, the mechanism for conveying and delivering the blanks comprising means for crossing the blanks flatwise to be operated upon in such condition by the bending mechanism.

Another object of the invention is to provide for the preparation of the blanks and bands for a succeeding basket while the blanks and bands previously fed to the forming and uniting mechanism are being operated upon to the end that the assembling and shaping mechanism may proceed with the formation of another basket as soon as the completed basket has been delivered.

The invention also has for its object to provide band forming or folding mechanism for forming or folding the bands and conveying them in such condition during the completion of a basket to positions from which said bands may be quickly applied to the next succeeding basket when the latter shall have reached the proper stage by the bending of the blanks.

Another object is to so dispose the band-feeding mechanism with relation to the form and die constituting the blank-bending mechanism that a band will be applied to the form during the movement thereof, thus obviating the necessity for bringing the form to a position of rest for the application of the band.

Another object of the invention is to associate separate band-feeding devices with the form and die, respectively, so that the movement of the form will simultaneously bend the body-forming blanks and present the inner band in position and in order that the outer band may be applied to the basket immediately upon the completion of the shaping or bending operation.

Still another object is to facilitate the feeding of the blanks and the delivery of the completed baskets by providing a feed table or support for conveying the blanks to the bending or forming mechanism and for receiving and delivering the completed baskets.

Figure 28:
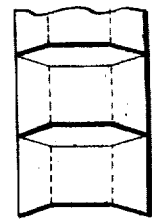
Figure 25:
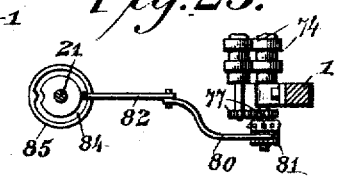
Figure 27:
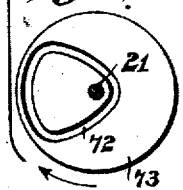
Figure 26:
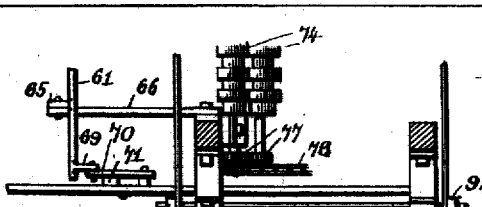
Figure 4:
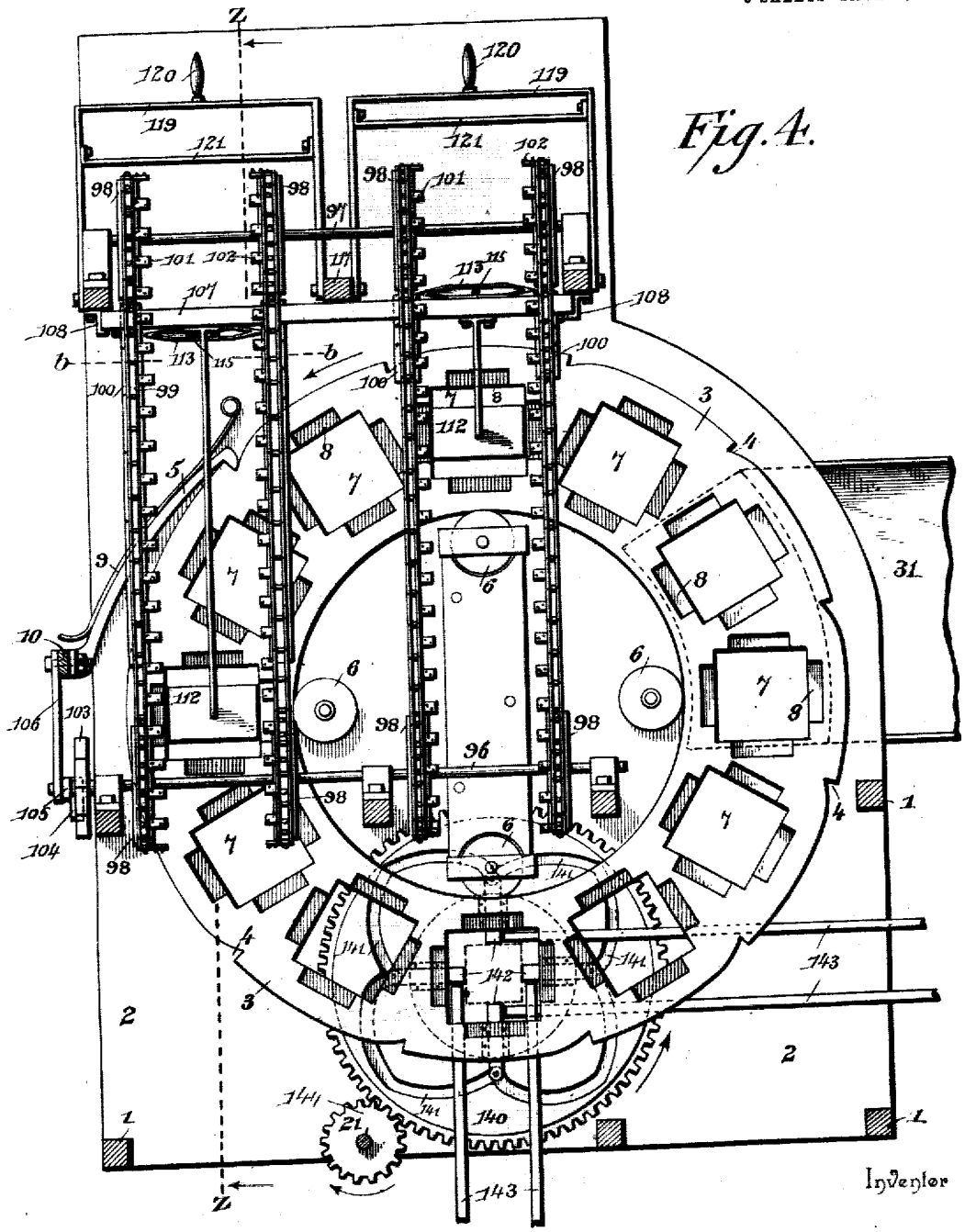
Figure 19:
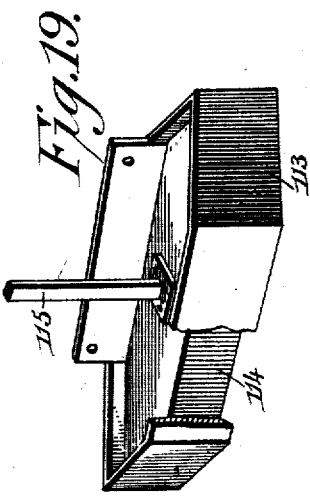
Figure 20:
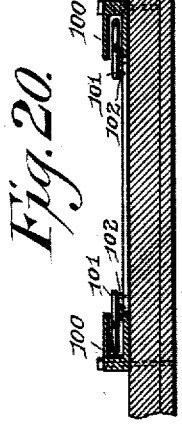
Figure 5:
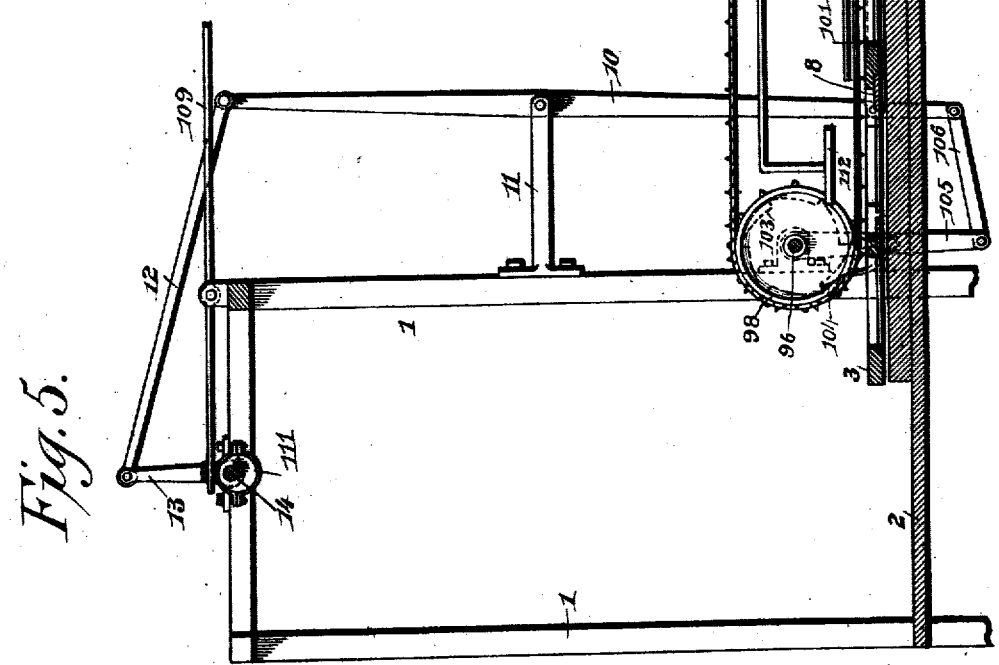
Figure 6:
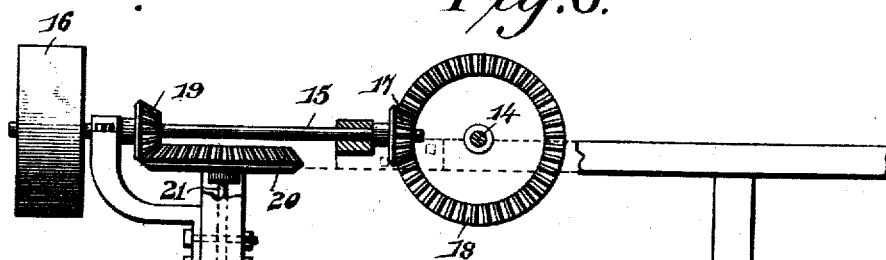
Figure 24:
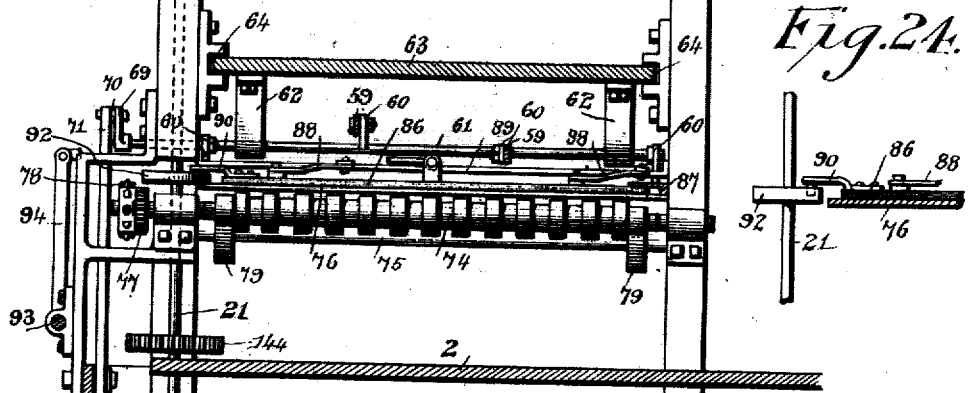
Figure 23:
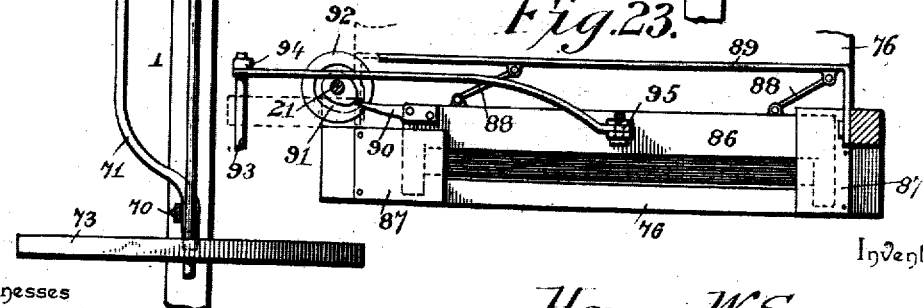
Figure 14:
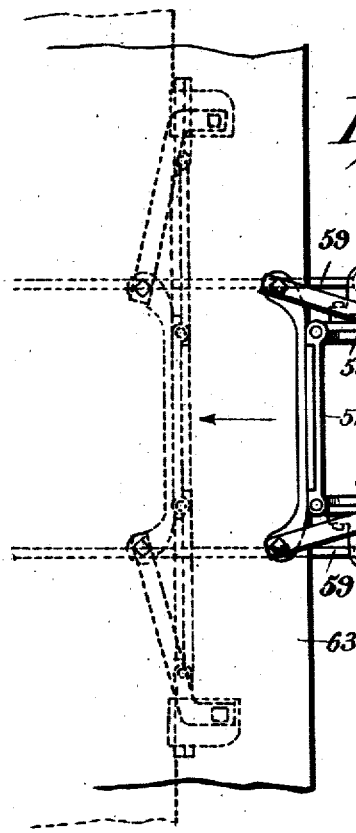
Figure 15:
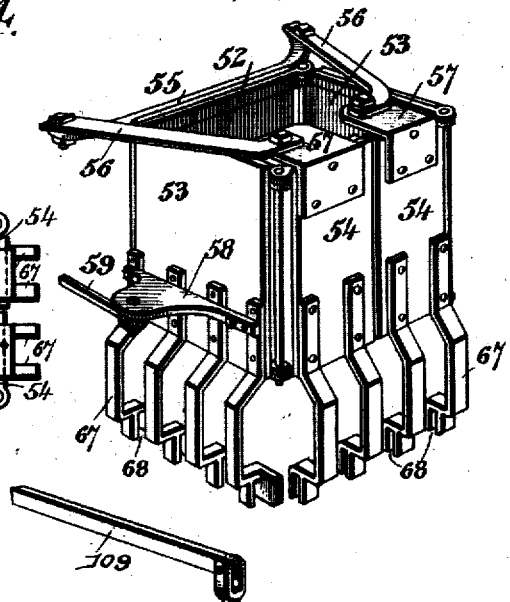
Figure 16:
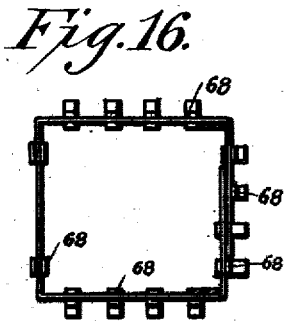
Figure 17:
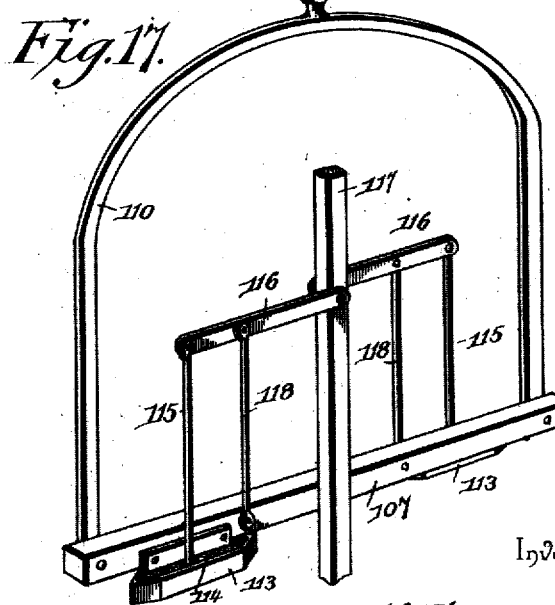

In the accompanying drawings, wherein I have illustrated one form of my invention, Figure 1 is a side elevation of a machine designed for attaining the objects of this invention. Fig. 2 is a view of the upper portion of the machine looking at right angles to Fig. 1 and from the right-hand side of the said figure, the parts being illustrated on a larger scale. Fig. 3 is a detail section on the line X X of Fig. 2. Fig. 4 is a plan section on the line Y Y of Fig. 1. Fig. 5 is a section of the machine about on the line Z Z of Fig. 4 looking in the direction indicated by the arrow. Fig. 6 is a section on the line W W of Fig. 1 looking to the left. Fig. 7 is a detail view of the middle and lower portions of the machine from the same point as Fig. 1, parts being in section and the whole on a larger scale. Fig. 8 is a sectional detail showing the position of the band folders when brought in register with the guide and feed mechanism for placing a band in position in the holders. Fig. 9 is a detail view showing the relation of the parts when the companion dies have separated after forming a basket and the latter moved forward upon the bed toward the chute. Fig. 10 is a view of a band-folder as seen from the active end when the complementary parts have been caused to aline. Fig. 11 is a detail view in section of the upper band-retainer. Fig. 12 is a detail view in perspective of the basket-ejector. Fig. 13 is a transverse section on the line $a\ a$ of Fig. 9. Fig. 14 is a top plan view of the upper band-folder, the full lines showing the relation of the parts when folded and the dotted lines the position of the elements when alined and in place to receive a band. Fig. 15 is a perspective view of a band-folder as it appears when closed. Fig. 16 is a detail view showing a band in position in a folder and having its ends overlapping. Fig. 17 is a detail view of the cutting mechanism for subdividing the strip or sheet of veneering or other stock into blanks of the requisite shape for forming the basket. Fig. 18 is a detail view of a combined cutter and crimper. Fig. 19 is a detail view in perspective of the cutter for separating the veneering or sheet material and the clearer coöperating therewith for removing the chip. Fig. 20 is a transverse section of a feed-chain and its guide about on the line $b\ b$ of Figs. 4 and 5. Fig. 21 is a fragmentary view of the female die and band retainer and guide coöperating therewith. Fig. 22 is a plan section on the line $c\ c$ of Fig. 8. Fig. 23 is a detail view of a band-cutter and its actuating means. Fig. 24 is a detail view in elevation of the means for imparting movement to the primarily-actuated band-cutter. Fig. 25 is a detail view showing the primary actuating mechanism for the initially-operated band-feeding mechanism. Fig. 26 is a detail view of the secondarily-operated band-feeding mechanism, showing the relation of the parts associated therewith. Fig. 27 is a plan view of the cams for operating the band feeding and folding mechanisms. Fig. 28 is a detail view showing a strip cut to form the blanks constituting the body of the basket.

Corresponding parts are referred to in the following description and indicated in the several views of the accompanying drawings by the same reference characters.

The machine-frame 1 is composed of a series of uprights and longitudinal and transverse members connected in any substantial manner and supporting a bed 2. Upon this bed is mounted the rotatable feed-table 3, which is preferably in the form of an annulus and has a series of peripheral notches 4, engaged by a pawl 5, Fig. 4, operated to move the table intermittently for the purpose of bringing the bottom and sides forming blanks into position to be operated upon by the blank-bending mechanism, to be described. The table 3 is held in place by a series of rollers 6, journaled upon pins projecting from the bed 2 and engaging its inner edge, as shown in Fig. 4, and is provided with a series of equidistant rectangular openings 7, disposed in a circle. In the upper side of the table at the edges of the openings 7 are formed recesses 8, designed to receive the terminal portions of the blanks to retain the latter against accidental displacement as the table is moved to feed the blanks. The pawl 5 is held against the notched edge of the table 3 by means of a spring 9 and has pivotal connection with a vertically-disposed lever 10, by means of which it is actuated. This lever (see Fig. 5) is fulcrumed to an arm 11, secured to the frame, and has its upper edge connected, by means of a pitman 12, with a crank-arm 13, secured to the end of a horizontal shaft 14, which is driven from a counter-shaft 15 by intermediate gearing, Fig. 6. As the shaft 14 rotates the lever 10 is oscillated to reciprocate the pawl 5, and thereby impart intermittent rotary movement to the table 3, which latter will obviously remain at rest during the movement of the pawl to the next notch after having caused a forward movement of the table. At this point it may be stated that the rotary feed-table 3 constitutes one of the elements of what I shall term "mechanism for conveying and delivering the bottom and sides forming blanks to the bending mechanism." A blank placed upon the table, which latter constitutes a feeder or conveyer traveling in the arc of a circle, will be turned by a quarter movement of said table to a position at right angles to that originally assumed by the blank, and a second blank fed to the table in a direction parallel to the feeding of the first blank thereto will be deposited upon the first blank in crossing relation to be operated upon in such condition by the bending mechanism. The conveying and delivering mechanism may therefore be said to comprise means for changing the angular relation of the blanks, and thus crossing the blanks flatwise to be operated upon in such condition. This mechanism for feeding and crossing the blanks is broadly new, and it is evident, therefore, that the rotary table and its complementary parts are not essential elements of the machine, since any mechanism of equivalent character for crossing the blanks and conveying them to the bending mechanism might be substituted in lieu thereof without departing from my invention.

The counter-shaft 15 is designed to impart motion to the several operating parts of the machine and is therefore provided with a band-pulley 16, which receives a drive-belt (not shown) extending from an engine or motor of any desired type. The shaft 14 is geared to the shaft 15 by a pinion 17 and a gear-wheel 18, and a second pinion 19, mounted upon the shaft 15, is in mesh with a gear-wheel 20, secured to the upper end of a vertical shaft 21 for driving the latter, motion being imparted by the said shaft 21 to the band cutters, feeders, and folders, as will appear more fully hereinafter.

I will now consider the basket-forming or blank-bending mechanism, which is that group of devices located to receive the bottom and sides forming blanks in crossed relation from the feeding and delivering mechanism and subsequently operated to bend the blanks to form a receptacle or basket of trunco-conical or cup-like shape. It should be understood, however, that in certain aspects of the invention the specific construction of this blank-bending mechanism is immaterial, and while the particular arrangement of parts to be immediately hereinafter described is considered preferable it may be varied within wide limits—e. g., the contour of the parts and the manner in which the relative movements thereof are effected. The blank-bending or basket-forming mechanism is located at one end of the machine and consists of a form 22 and a die 23, the latter arranged below the plane of the table 3 and the former normally above the said table. The die 23 is preferably stationary and is secured to the frame with its upper edge spaced from the lower side of the table 3 to admit a band to embrace the upper edge portion of the basket projecting above the die. The upper edge of the die 23 is flared to facilitate the entry of the blanks therein under the action of the male die or form 22, and its sides are grooved, as indicated at 24, Fig. 13, to afford clearance for the bent ends of the drivers 25, by means of which the outer band is forced into position after the basket has been shaped. This latter statement should be particularly noted, because, as I shall hereinafter explain, my invention contemplates the bending of the basket-bands into their proper form and thereafter placing the bands in position upon the basket—that is to say, inside and outside of the upper edges of the blanks. The inner band is formed and positioned at a point above the die, and the outer band is similarly formed and positioned at a point below the die. At the proper time these bands are urged to their proper positions upon the basket and are secured in place by staples or other uniting devices. A guide 26, secured to the bed 2, encircles the die 23 and has grooves 27 opposite the grooves 24 and forming therewith passages to receive the active ends of the drivers 25 when the outer band is advancing toward the basket from below. The upper end portion of the guide 26 projects above the die 23 and terminates immediately below the table 3 to hold the outer band in place during the stapling or stitching operation. An automatic ejector is associated with the die 23 to remove the completed box or basket therefrom and preferably consists of a follower 28 and bars 29, extending downwardly from the follower and guided in the die 23, Figs. 12 and 13, the ejector being normally held in its elevated position by a spring 30. When the form 22 descends, the ejector is forced downward against the resistance of the spring 30, but moves upward and ejects the completed basket from the die when the form is raised. The basket is then received by an opening in the feed-table, as will be explained, and is advanced along the bed 2 by means of the table 3 until discharged through a chute 31, Fig. 1. To guide the outer band past the inner band, which has been forced home upon the form 22, springs 32 are located at the four corners of the die 23, Figs. 9, 13, and 21, and extend across the space formed between it and the guide 26, thereby preventing the outer band engaging the inner band when forced home upon the basket prior to stapling. The springs 32 are secured at their lower ends to the sides of the die 23, and their upper ends enter depressions in the guide 26, as clearly indicated in Fig. 21. In the present embodiment of the invention the plunger or form 22 is movable vertically, and a simple form of operating means includes a pitman 33, connected to the form, and a cam 34, secured upon the shaft 14 and provided in one side with a cam-groove 35, in which operates a pin 36, secured to a pitman 37 for independently operating the upper set of drivers, which advance the inner band to its position on the form in much the same manner as the lower set of drivers advance the outer band to its position at the upper end of the die. The pitman 33 has connection at its upper end with a wrist-pin projecting laterally from the cam 34 and also has a slot 38, in which operates the pin 36 and guides 39 to receive a slide 40, receiving the pin 36. A cross-bar 41 operates in a slot 42 in one of the frame members (see Fig. 3) and has rods 43 connected therewith and supporting the upper set of band-drivers 25. The cam-groove 35 is equidistant from the center of the cam 34 for about half the circumferential length thereof, and the remaining half gradually approaches the center and then makes an abrupt curve, as clearly indicated in Fig. 2, whereby a quick movement is imparted to the upper set of drivers to force the upper band from the band folder or former, to be described, into the interval between the form 22 and a band retainer or guide 44, surrounding the form. (See Fig. 9.) This movement takes place after the upper band has been folded and brought into position around the form 22 and just as the latter moves downward toward the die. This manner of applying the upper band to the form should also be particularly noted, because it is highly desirable to provide for constructing succeeding baskets without necessitating the stoppage of the active bending member in order to provide an interval of rest for the application of any of the component parts of the basket. While the basket is being completed by the stapling of the blanks, the bands are being prepared and positioned preparatory to being applied to the succeeding basket. Obviously no interval of rest is necessary to permit the application of the body-blanks to the die, because this is done while the form is receding, and as I have also made provision for applying the inner band to the form without bringing the latter to rest it will be observed that there is absolutely no loss of time incident to this operation. In other words, the form as soon as it reaches the upper limit of its movement starts down to bend the blanks of the next succeeding basket, and just at this time the upper drivers 25 drive down the inner band to its proper position upon the form, where it is held by the retainer 44 and carried down for disposal within the upper edges of the basket when the blanks shall have been bent around the form. The upper portion of the form 22 tapers reversely to its lower or active portion and is provided in its sides with grooves 45 to receive the drivers 25 when the latter descend to displace the band from the upper band-folder and force it into the space formed between the parts 22 and 44. The band guide or retainer 44 comprises a series of lugs 46, having tapering extensions 47, which curve toward the form 22, and a band or strip supporting said lugs and normally encircling the upper portion of the form, as shown clearly in Fig. 9. The band-retainer moves down with the form, as stated, and the upper or inner band of the basket is therefore held between the form 22 and the tapering extensions 47 of the retainer until the bands and blanks are united, the removal of the completed basket from the form finally withdrawing the inner band from engagement with the retainer.

In referring to the rotary feed-table 3 I have viewed it merely as an element of the blank-feeding mechanism; but the fact that it moves beyond the blank-bending or basket-forming mechanism enables it to be utilized also as basket-delivering mechanism—that is to say, mechanism for conveying the completed basket from the forming devices and depositing it at any suitable point—as, for instance, at the upper end of a feed-chute—this capability of the structure being utilized in the following manner: A follower or ejector 48 is applied to the lower end of the form, recessed to receive the same, (see Fig. 8,) and its stem 49 operates in guide-openings formed in the body of the plunger and in a cap 50, the latter closing a space in which is located a spring 51, surrounding the stem 49 and exerting an outward pressure thereon, so as normally to hold the ejector 48 away from the active end of the form. Therefore when the form is moved away from the die 23 the completed basket will be ejected from said form and deposited in an opening in the feed-table for delivery to the chute 31 as the table is advanced. The spring 51 is confined between the upper end of the space closed by the cap 50 and a stop provided on the stem 48, said stop serving to limit the downward movement of the follower, as will be readily understood.

I now come to consider the band-folding mechanism, which is that arrangement of devices which receive the bands severed from sheets of veneering, and after conveying said bands to the zone of activity of the blank-bending mechanism bend them into rectangular form in proper position to be operated upon by the drivers in the manner heretofore described. The band-folders for the inner and outer basket-bands are duplicated and are located above and below the table in reversed positions. Each folder comprises a back plate 52, side plates 53, hinged at their edges to the edges of the back plate, and front plates 54, which in turn are hinged to the side plates 53, and which are about half the width of the back plate, so as unitedly to close the space formed between the front edges of the side plates when the latter are disposed in parallel relation. Obviously the hinging of these plates or holder members in the manner shown is not essential, since any character of mounting which will permit relative movement of the members to fold a band may be substituted for the illustrated construction. A bar 55 is secured to one edge of the back plate 52, and its end portions curve outwardly and rearwardly, and elbow-shaped links 56, pivotally connected with the curved extremities of the bar 55, have their bent ends pivoted to angle-irons 57, secured to the front plates 54. The elbow-links 56 are constructed and disposed so that upon opening the side plates 53 the front plates 54 will likewise open and bring the several plates into alinement, as indicated by the dotted lines in Fig. 14 and the full lines in Fig. 10, thereby enabling the band-folder to receive the edge portion of the strip or sheet which, when severed, forms the band. Brackets 58 are secured to the side plates 53 and have rods 59 connected therewith, said rods making connection with arms 60, projecting from a rock-shaft 61, journaled in bearings 62, projecting from a slide 63, bearing the band-folder, said slide operating in suitable guides 64, applied to the frame 1. Arms 65 project from the rock-shaft 61 and have their outer ends connected by means of links 66 with the frame, whereby upon imparting a rocking move-shaft 21, whereby in the operation of the machine a longitudinal movement is imparted to the upper knife and the latter simultaneously advanced by the swinging of the links 88, as will be readily comprehended. A rock-shaft 93 is located about in the plane of the bed and has oppositely-extending radial bars 94, each of which makes connection with an extension 95, projecting from the respective knives 86. The shaft 93 is rocked in its bearings by means of its connection with the upper knife 86 and transmits motion to the lower knife in an obvious manner. The connections are such as to cause the knives to operate simultaneously, whereby both the inner and outer bands are cut synchronously and while the band-folders are in register with the delivery ends of the guides 75.

I now come to a somewhat more specific consideration of the mechanism for conveying and delivering the bottom and sides forming blanks into the zone of action of the bending mechanism. We have seen that the movement of the table moves a blank from one point to another and changes its angular position, so that a second blank fed in the same direction and imposed upon the blank, the position of which is thus changed, will bear a crossing relation thereto. The feeding of the blanks and the depositing thereof upon the table or feeder may obviously be effected in many ways; but I have devised as an element of the feeding mechanism a second feeder, which in this embodiment of the invention comprises feed-chains disposed in parallel relation and designed to convey the blanks from the point at which they are severed from the sheets of veneering and deposit said blanks at the proper points upon the table. By this means the blank fed to the table by one of these chains is carried forward and its angular position changed by the rotation of the table, so that when the blank thus carried has reached a position opposite the other chain it will be presented endwise thereof, so as to be in crossing relation with a second blank fed to the table and deposited upon the first blank by the second conveyer. Therefore as the table and the means for delivering the blanks thereto constitute independent feeders the invention in one aspect thereof may be said to embrace broadly feed mechanism for carrying the blanks into the zone of action of the bending mechanism and also causing the blanks to cross each other, said feed mechanism comprising a pair of independent feeders for respectively carrying the separate blanks.

Shafts 96 and 97, disposed in parallel relation and journaled at or near their ends in bearings provided on the frame, are located a short distance above the rotary table and are provided with pairs of sprocket-wheels 98, which support feed-chains 99, the lower portions of which operate over the rotary table and bed, so as to advance the bottom and sides forming blanks to the openings of the rotary table. One set of feed-chains is located about opposite the center of the rotary table and the other set about in line with the outer portion thereof, so as to feed the blanks in position to cause them to cross, as will be apparent by reference to Fig. 4. The lower portions of the feed-chains travel through a guide 100, secured to the band and extending over the rotary table, whereby the blanks are carried forward clear of the table, so as not to impede the movement thereof or drag upon the table. Ears 101 extend inwardly from the links of the feed-chains and are provided on their lower faces with spurs or points 102, which enter the blanks and carry them forward in a positive manner. The shaft 96 is extended at one end and provided with a ratchet-wheel 103, with which coöperates a pawl 104 for turning the shaft and moving the feed-chains a proper distance to bring a blank in position to be received in an opening of the table. A swinging arm 105, mounted on the projecting end of the shaft 96, carries the pawl 104 and has connection at its lower end with the lever 10 by means of a link 106. As the lever 10 vibrates the arm 105 receives a corresponding oscillatory movement and through the pawl 104 and ratchet-wheel 103 imparts movement to the shaft 96 and feed-chains to advance the blanks to the feed-table.

A cross-head 107 is slidably mounted in guides 108, applied to the frame, and is reciprocated vertically by means of a lever 109, connected at one end with the cross-head by a rod 110 and having its opposite end adapted to engage with an eccentric or cam 111, secured upon the shaft 14. Plungers 112 have connection with the cross-head and operate to release the blanks from the feed-chains when said blanks are properly positioned above the openings of the rotary table. When the plungers descend, they engage the blanks carried by the feed-chains and detaching them from the spurs or points 102 cause said blanks to drop upon the table above the openings therein and with their ends seated in the recesses 8, positioned for their reception.

In connection with the blank-feeding mechanism for feeding and delivering the blanks to a form I have provided mechanism for severing the blanks from sheets or strips of veneering just as the bands are severed from such sheets, as already described. Cutters 113 are secured to the cross-head 107 and comprise a pair of knives or blades having their middle portions extending parallel and their end portions converging, whereby the terminal parts of the blanks are slightly flared in correspondence with the truncoconical form of the completed basket. Clearment to the shaft 61 the latter will, by reason of the connection 65 and 66 with the frame, move the slide 63 to cause the band-folder to travel toward and from the basket-forming or blank-bending mechanism.

The several plates comprising a band-folder are provided with holders consisting of fingers 67, having their free ends cleft, as shown at 68, to receive the band and retain it while the folder is operated to carry the band to the form or die, as the case may be, and to fold said band into that rectangular form in which it is applied to the blanks. These fingers 67 are offset in their length to so dispose their cleft ends with respect to the basket as to properly position the band. A crank-arm 69 is provided at one end of each rock-shaft 61 and is connected, by means of a rod 70, with a lever 71, fulcrumed intermediate of its ends to the frame and having its lower end entering a cam-groove 72, formed in the upper side of a disk or plate 73, secured to the lower portion of the vertical shaft 21. By the means just described the shafts 61 are rocked in their bearings and the band-folders operated in the manner set forth through the connections herein recited.

In the operation of the folder it is of course necessary to provide means for causing the ends of the band to properly overlap without interference when the folder closes about the form. To secure this result necessitates one side and front plate 53 and 54 reaching a closed or folded position in advance of the other side and front plate. This is accomplished by reason of the fact that the rock-arms 60 of each rock-shaft 61 are disposed at direct right angles to each other, and consequently occupy different positions with relation to the dead-center. The relative disposition of the rock-arms 60 is plainly shown in Fig. 6 of the drawings, and at this point it may be further observed that by reason of providing these means for closing one side or front plate of the folder in advance of the other the ends of the bands are not only permitted to properly overlap, but the two front plates 54 are prevented from interfering in case of their being of a greater width than that shown in Figs. 14 and 15 of the drawings.

The construction just described comprehends mechanism for causing the articulated members of the band-folders to move to positions substantially at right angles to each other to fold the bands, and we have already seen that separate means is provided for conveying the bands in their folded condition to their proper places upon the basket-body. The invention, however, comprehends not only the delivery of previously-folded bands to the body-blanks, but also the provision of mechanism for automatically feeding a sheet of veneering and severing the bands therefrom prior to the folding of the bands and their delivery to the basket.

A pair of feed-rolls 74 are located upon opposite sides of a guide 75 and are grooved at intervals in their length to correspond with openings formed in the sides of the said guide 75, whereby the active portions of the feed-rolls are adapted to engage with the opposite sides of the strip or sheet of band material, so as to advance it the proper distance beyond a plate 76 and into the holders of the band-folder, which are brought into position opposite the delivery end of the guide 75, as clearly indicated in Fig. 8. These feed-rolls 74 are connected by gearing 77, so as to revolve in unison, and are intermittently operated to feed the strip of veneering a distance equal to the width of the band to be formed. The inner or delivery end of the guide 75 is deflected to give proper direction to the strip and enable the latter to be fed edgewise to the folder, after which the severed band is moved sidewise in a horizontal direction to a position above or about the form or below the die, as the case may be. The feed-rolls are located at the side of the plate 76 opposite the cutting mechanism and the band-folder and are placed as near as possible to the plate to insure a positive feed of the strip. A sprocket-chain 78 connects the upper and lower pairs of feed-rolls and passes around sprocket-wheels secured to a shaft or journal of a roll of each pair, thus serving to transmit motion from one to the other. Suitable means—as, for instance, springs 79—are provided for urging the feed-rolls of each pair together, so as to compel them to grip the strip passing between them with sufficient force to urge the said strip forward. The initial power may be applied to either set of feed-rolls, but is preferably applied to the lower set by means of a pawl 80, (see Fig. 25,) having its active end engaging with the teeth of a ratchet-wheel 81, secured to a journal of one of the lower feed-rolls. This pawl has pivotal connection with a bar 82, slidably mounted in a guide 83 and having its bent end entering a cam-groove 84, formed in the side of a plate or disk 85, secured to the shaft 21.

A knife 86, constituting band-severing mechanism, is provided to operate in conjunction with each plate 76 and guide 75 for severing the bands from the strips, and this knife is directed in its movements upon the slide 76 by guides 87, secured to the plate. Links 88 connect the knife 86 with a bar 89, secured to the frame and serve to advance the knife laterally when said knife is moved longitudinally, the links 88 being normally positioned as indicated in Fig. 23. An arm 90 extends from one end of the upper knife and its outer end enters a cam-groove 91, formed in a plate or disk 92, secured to the ers 114 operate in the space formed between the component parts of the cutters 113, and their stems 115 are connected to the outer ends of bars 116, pivoted at their inner ends to a rod 117, forming a part of the frame. These pivoted bars 116 have connection at a point about midway of their ends with the cross-head 107 by means of links 118, so that in the operation of the machine the clearers receive a differential movement whereby they are reciprocated within the space formed by the elementary parts of the cutters 113. The construction and operation of this part of the machine will be understood by reference to Fig. 17, which shows the stems 115 at a greater distance from the pivotal ends of the bars 116 than the links 118. Inasmuch as the point of connection between the parts 115 and 116 travels in a larger circle than the point of connection between the parts 116 and 118, it is obvious that the plunger or clearer 114 will move proportionately faster than the cutter 113. The parts are so disposed that the instant the cutters 113 have advanced to cut the blanks the clearers will move forward and clear the cutters of the chips, thereby preventing choking and a filling of the cutters, which would soon occur if no provision were made for disposing of the chips resulting from cutting the blanks from the strips of veneering in the manner set forth. The rod 110, herein referred to, is of arched form for connection at its extremities with the terminals of the cross-head 107 and has connection at an intermediate point with the lever 109, as shown clearly in Fig. 17.

It frequently happens that the strips of veneering or other sheet material forming the body of the box or basket are not of a length to be subdivided into equal parts without leaving end portions which are unserviceable, and in order that provision may be had for removing the useless end portions and cutting the strips square across a trimmer is provided as a complementary device for each feed-chain. This trimmer consists of a frame 119, pivoted to a convenient portion of the machine-frame and provided at its free end with a handle 120 and at a short distance therefrom with a knife 121, which when lowered cuts off the useless end portion of the strip. A spring 122 normally retains the frame 119 and holds the knife 121 elevated.

The strips or sheets of veneering from which the bands are to be formed are fed to the machine upon tables 123, and a cutting and crimping mechanism is provided to prevent the overriding of abutting ends of separate strips when a new strip is placed in position—that is to say, the rear end of the sheet of veneering or other material being comparatively thin is liable to be overlapped by the front end of a new strip fed over the table. To obviate this difficulty, the rear end of the old strip is cut square across and crimped, and the advancing end of the new strip is correspondingly treated, whereby the crimped or deflected portions of the two strips or sheets engage to prevent this overriding. A frame 124 is pivoted at one end and is provided at its free end with a handle and carries a knife 125 and a cross-bar 126, the latter having notches 127 and corresponding projections 128, the notches 127 coming opposite corresponding projections 129, provided on the table 123. Depressions 130 are formed in the table opposite the projections 128 and operate in a similar manner to the notches 127. The coöperating notches and projections constitute the crimping mechanism and serve to crimp or spread the meeting edges of the strips, whereby said edges are caused to abut for the purpose stated. A spring 131 supports the pivoted frame 124 and holds the crimper normally out of the path of the veneering.

As previously explained, the upper and lower drivers 25 for driving the previously-formed bands to their proper positions are similarly constructed and consist of a band 132 and a series of independent strips or fingers 133, attached at one end to the band and having their free ends bent, as shown at 134, so as to project across the band and insure its displacement from the holders 67 of the band-folders, said bent ends operating in the offset portions of the holders. It will be noticed that the offset holders 67 are applied to the plates 53 and 54, having angular motion, whereby interference is avoided with the bent ends 134 of the fingers 133 when opening and closing the said plates. The means for operating the upper driver has been set forth at length herein. The actuating mechanism for the lower driver consists of a lever 135, having one end slotted, as shown at 136, to engage with a pin connected with a stem 137, depending from the lower driver, and the opposite end of said lever enters a cam-groove 138 in the periphery of a cam-wheel 139, secured to the lower end of the shaft 21.

Suitable uniting mechanism—as, for instance, stitching or stapling devices—is provided for securing the bands and body-blanks of the basket together; but as the specific form of such mechanism constitutes no part of the present invention it will not be referred to in detail, and a part only thereof is illustrated for the purpose of showing its relative position. A disk or plate 140 is located at one end of the machine and has a central opening of ample size to permit of the plunger, stock, and basket passing therethrough and is provided in one side with a series of cam-grooves 141 for actuating staplers 142, by means of which the staples are driven forward at the proper time, thereby completing the operation in the formation of a box or basket. The staple-races are indicated at 143, and the staplers 142 operate across their ends, so as to drive home the staples fed into position thereby. A pinion 144, secured to the shaft 21, intermeshes with cog-teeth at the periphery of the disk or plate 140 and rotates the latter, whereby the stitching or stapling mechanism is operated.

Before proceeding to describe the operation of the machine attention may be called to the fact that the apertured table 3 not only performs the various functions heretofore ascribed to it, but also constitutes a folder intermediate of the form and die. The blanks, held in crossed relation opposite an opening in this table or plate, are bent toward the form by the edges of the opening as the form passes through said opening prior to the delivery of the blanks to the die, where the shaping of the basket is completed.

The operation of the machine is as follows: The strips or sheets of veneering or other suitable material for forming the body-blanks and bands of the receptacle or basket are fed over the bed 2, Fig. 5, and the tables 123, Fig. 7, in the manner heretofore described. Bottom and sides forming blanks are severed from the veneering by the knives or cutters 113 and are carried forward by the feed-chains 99. One of these chains feeds a blank radially toward the table and deposits it over an opening 7 therein. As the blank is disposed transversely across this chain the change of its angular position, due to a quarter-turn of the table, will place the blank endwise of the second chain or set of chains, which is disposed tangentially with respect to the table. The blank fed forward by this second chain will therefore be deposited upon the first blank in crossing relation therewith, the blanks being retained in their proper relative positions upon the table by the engagement of their ends with recesses 8. Continued movement of the feed-table 3 in the direction of the arrow in Fig. 4 will present the crossed blanks above the die 23 and under the form 22. During this interval required for the presentation of the blanks to the blank-bending mechanism the sheets of veneering deposited upon the tables 123 will be fed forward by the feed-rolls 74, and the edge of the sheet extending beyond the guide 75 will be received within the holders of the band-folding devices, the articulated sections of which will be disposed in substantial alinement. The bands will be severed from the veneering and the folders will be advanced toward the zone of activity of the blank-bending mechanism and will fold the bands and deposit them in position to be engaged by the drivers 25. These several operations—that is to say, the feeding of the body-blanks and the preparation of the bands—will be substantially synchronous, and therefore as the form rises from the die the body-blanks will be presented above the latter and the bands will be positioned in the manner stated. As soon, therefore, as the form reaches the upper limit of its movement it may begin at once to descend again. At this time, however, the drivers will be operated, the lower driver slowly at first and the upper driver with a quick motion, to drive the inner band out of the upper band-folder and to deposit it in place upon the form, where it will be held by the guide or retainer 44. The form carrying the inner band properly folded thereon will now impinge upon the subjacent body-blanks, forcing them down in the die and bending their ends up around the form to produce the body of the basket. While this bending of the blanks is being effected, the lower driver 25 will be moved up slowly, and just as the shaping and bending operation is being completed the movement of the lower drivers will be accelerated to move the outer band quickly to its surrounding position at the upper edges of the body-blanks. The stapling mechanism will now be brought into action and, during the completion of the basket the preparation of other blanks and bands will be proceeded with and positioned in their proper order, as heretofore described. As soon as the uniting or stapling mechanism has completed its operation the form will be raised, and as the spring 30 of the ejector 28 is somewhat stronger than the spring 51 of the ejector 48 the completed basket will be carried upward with the form until it reaches a position above the table. The basket will now have moved out of the range of influence of the ejector 28, and the ejector 48 on the form will detach the basket from the latter and deposit it in an opening in the table 3, the next movement of said table serving to deliver the completed basket to the chute 31 and to present another pair of body-blanks to the blank-bending or basket-forming mechanism.

The term "crossing" employed to define that relation of the bottom and sides forming blanks which is essential to the production of a basket in which each blank contributes to the formation of both the bottom and sides thereof is to be understood as distinguishing from the mere overlapping of the contiguous edges of a pair of blanks, since the present invention includes as an important feature means, broadly, for crossing a pair of blanks as distinguished from means for presenting a pair of blanks in overlapping relation.

It is thought that from the foregoing the construction and operation of this, the preferred embodiment of my invention, will be clearly comprehended; but since the invention in many aspects is broadly novel I do not limit myself to the structural details defined, as, on the contrary, I wish to be distinctly understood as reserving to myself the right to effect such changes, modifications, and variations of the illustrated structure as may be fairly embraced within the scope of the protection prayed.

What I claim is—

1. In a basket-making machine, the combination with blank-bending mechanism, of mechanism for conveying and delivering the bottom and sides forming blanks thereto, said mechanism comprising means for causing the blanks to cross with their ends projecting beyond opposite sides of each other.

2. In a basket-making machine, the combination with bending mechanism, of mechanism for conveying and delivering the bottom and sides forming blanks thereto, said mechanism comprising means for crossing the blanks flatwise with their ends projecting beyond opposite sides of each other to be operated upon in such condition by said bending mechanism.

3. In a basket-making machine, the combination with blank-bending mechanism, of mechanism for conveying and delivering the bottom and sides forming blanks thereto, said mechanism comprising means for changing the angular relation of the blanks and thus crossing the blanks flatwise to be operated upon in such condition by said bending mechanism.

4. In a machine of the class described, the combination with bending mechanism, of a feed mechanism for carrying the blanks into the zone of action of the bending mechanism, and also causing the blanks to cross with their ends projecting beyond opposite sides of each other, said feed mechanism comprising a pair of independent feeders for respectively carrying the separate blanks.

5. The combination of blank-bending devices, a conveyer moving in the arc of a circle to convey a blank to the blank-bending devices, and another conveyer to feed another blank, the two conveyers so arranged as to place one blank crosswise of the other.

6. In a basket-making machine, the combination with a pair of shaping-dies, and means for opening and closing them, of a blank feeding and crossing mechanism consisting of means for feeding one blank forward in a straight line, and a conveyer traveling in the arc of a circle, for feeding a second blank forward, so that the two will lie crosswise of each other.

7. In a basket-making machine, the combination of bending-dies, conveying means for one blank, a conveyer having a horizontally-arranged seat or holder for another blank, and means for moving said conveyer horizontally in the arc of a circle to place the blank carried thereby crosswise of the first-mentioned blank.

8. In a basket-making machine, the combination with bending mechanism, of mechanism for conveying and delivering the bottom and sides forming blanks thereto, said latter mechanism comprising means for crossing the blanks flatwise and for subsequently delivering the crossed blanks to be operated upon in such condition by said bending mechanism and means for holding the blanks while being operated upon.

9. In a basket-making machine, the combination with bending mechanism, of a feed mechanism comprising a pair of independent feeders for respectively carrying the separate blanks and arranged to provide for the crossing of the latter, one of said feeders being also arranged to hold the crossed blanks while being operated upon by the bending mechanism.

10. In a machine of the class described, the combination with bending mechanism, of a feed mechanism for crossing the blanks and carrying them into the zone of action of the bending mechanism, one of the elements of said feed mechanism serving as a carrier for the formed basket.

11. In a basket-making machine, the combination of blank-bending devices, a conveyer moving in the arc of a circle to convey a blank to the blank-bending devices, and another conveyer to feed another blank, the two conveyers being so arranged as to place one blank crosswise of the other, and one of said conveyers serving as a carrier for removing the formed basket from the zone of the blank-bending devices.

12. In a basket-making machine, the combination with blank-bending mechanism, of mechanism for conveying and delivering the bottom and sides forming blanks thereto, said latter mechanism comprising means for changing the angular relation of the blanks, and also comprising means for holding the blanks in crossed relation while operated upon by the bending mechanism, and for removing the formed basket from the zone of the latter.

13. In a basket-making machine, the combination with a pair of shaping-dies, of a table adapted to receive uncut sheets of veneering, cutting means adapted to cut blanks of the required size from the stock, and a plurality of conveying devices for conveying a pair of blanks from the table to the shaping-dies, said conveying devices being arranged to place the blanks crosswise of each other prior to their presentation to the shaping-dies.

14. In a basket-making machine, the combination with a pair of shaping-dies, of a table adapted to receive uncut sheets of veneering, cutting means adapted to cut blanks of the required size from the stock, a conveyer adapted to receive a cut blank and carry it in an arc of a circle into a position substantially at right angles to the position it occupied on the said table and means for placing a second blank in crossing relation with the blank carried by said conveyer.

15. In a basket-making machine, the combination of a pair of shaping-dies, means for opening and closing them, means for feeding sheets of veneering toward the dies, means for cutting out of said sheets blanks for the body portion of the basket, and means for conveying the blanks to and placing them crosswise between the shaping-dies to project beyond each other on two sides.

16. In a basket-making machine, the combination with the blank-bending mechanism, and the movable table, of means for delivering separate blanks to the table, said movable table and the means for delivering the blanks thereto being so arranged as to cause the blanks to cross each other.

17. In a basket-making machine, the combination with the blank-bending mechanism, of a feed mechanism for carrying the blanks into the zone of action of the bending mechanism, and also causing the blanks to cross each other, said feed mechanism comprising a table having openings therein, and a pair of separate blank-carrying devices associated with the table.

18. In a basket-making machine, the combination with the blank-bending mechanism, of a feed mechanism, including a table having openings, for carrying the separate blanks into the zone of action of the bending mechanism, said feeding mechanism causing the said blanks to cross each other over the openings of the table.

19. In a basket-making machine, the combination with the blank-bending mechanism, of a feed mechanism, including a movable table having openings, for carrying the separate blanks into the zone of action of the bending mechanism said feeding mechanism causing the said blanks to cross each other over the openings of the movable table.

20. In a basket-making machine, the combination with the blank-bending mechanism, of a feed mechanism, including a rotary table having openings, for carrying the separate blanks into the zone of action of the bending mechanism said feeding mechanism causing said blanks to cross each other over the openings of the rotary table.

21. In a basket-making machine, the combination with the blank-bending mechanism, of a table having rectangular openings and provided with recesses in its upper side at the edges of the openings to receive the end portions of crossed blanks and retain them in place.

22. In a basket-making machine, the combination with the blank-bending mechanism, of a rotary table having openings to receive the blanks and carry the same to the bending mechanism, a device for supplying a blank to an opening in the table, and a second device for placing another blank over said opening in crossing relation with the blank first supplied 23. In a basket-making machine, the combination with the blank-bending mechanism, of a rotary table provided with a series of openings, and separate devices for placing blanks over the openings at different positions of the table, whereby the said blanks cross each other.

24. In a basket-making machine, the combination with the blank-bending mechanism, of a rotary table having a series of openings, a pair of feed-chains radially disposed for supplying blanks to the openings, and a second pair of feed-chains disposed tangentially for advancing the blanks to the openings and at right angles to the blanks previously placed in position.

25. In a basket-making machine, the combination with the blank-bending mechanism, of a rotary table provided with openings, a radial and a tangential set of feed-chains for advancing the blanks to the openings of the table in the manner set forth, and plungers coöperating with each set of feed-chains to dislodge the blanks and properly position them with respect to the openings of the table.

26. In a basket-making machine, the combination with the blank-bending mechanism, of a table provided with openings, a set of feed-chains having spurs or points to make positive engagement with the blanks, said feed-chains and the table being so operated and arranged as to cause the blanks to cross each other, and plungers for dislodging the blanks from the chains.

27. In a basket-making machine, the combination with the blank-bending mechanism, of a rotary table provided with openings, a radial and a tangential set of feed-chains provided with lateral extensions having spurs or points to make positive engagement with the blanks and carry them forward, and plungers for dislodging the blanks from the spurs of the feed-chains.

28. In a basket-making machine, the combination with the form, of a feed-table provided with openings adapted to be brought opposite the form, and an ejector adapted to eject the baskets off the form into the openings.

29. In a basket-making machine, a form, in combination with a rotary feed-table provided with openings, means for bringing the openings opposite the form, and an ejector adapted to eject the baskets off the form into the openings.

30. In a basket-making machine, the combination with the form, of a blank feeding and crossing mechanism, including a feed-table provided with openings, for carrying the crossed blanks into the plane of the form, and an ejector adapted to eject the baskets off the form.

31. In a basket-making machine, the combination of blank-bending mechanism comprising a form and die, means for separating these two members and for subsequently restoring their coöperative relation, means for automatically feeding blanks to the die while so separated from the form and for crossing said blanks, with their ends projecting beyond opposite sides of each other and means for applying a band to the form.

32. In a basket-making machine, the combination with blank-bending mechanism comprising a form and die, of means for effecting the separation and approach of said members, means for feeding crossed blanks to the die and means for feeding a previously-formed band to the form while the die and form are separated.

33. In a basket-making machine, the combination with blank-bending mechanism comprising a form and die, of means for automatically crossing a pair of blanks and for subsequently feeding the crossed blanks to the die, means for applying a band to the form while said form is separated from the die, means for operating the bending mechanism to bend the blanks around the form, and means for uniting the blanks and band while on the form.

34. In a basket-making machine, the combination with a die, and a form movable toward and away from the die, of means for so moving the form, means for applying a band to the form during its movement, and means for feeding body-forming blanks opposite the die.

35. In a basket-making machine, the combination with a die, and a form movable toward and away from the die, of means for applying a band to the form during its movement toward the die, and means for feeding body-forming blanks opposite the die.

36. In a basket-making machine, the combination with a die, and a form movable toward and away from the die, of means for so moving the form, means for applying a band to the form during its movement, and means for automatically feeding body-forming blanks in crossed relation opposite the die.

37. In a basket-making machine, the combination with a die, and a form movable toward and away from the die, of means for so moving the form, means for feeding body-forming blanks opposite the die, means for applying an inner band to the form during its movement, and means for placing an outer band around the die and for moving said outer band to its proper position on the basket as the form comes to rest.

38. In a basket-making machine, the combination with blank-bending mechanism comprising a form and die, of feeding mechanism for applying an inner band about the form while said form is separated from the die, means for crossing body-forming blanks and for depositing the crossed blanks opposite the die, means for operating the bending mechanism to fold the blanks about the form, band-applying means for applying an outer band to the blanks, and stapling mechanism for uniting the bands and blanks on the form.

39. The combination with a feed-table provided with an opening over which the blanks are placed, of blank-bending mechanism comprising a form and die, one of said elements being adapted to pass through the opening, means for supplying a band to the form, and uniting mechanism for uniting the blanks and band.

40. The combination with a form and die, of means for holding a band-blank, means for folding said blank to form a band, and means for subsequently transferring the formed band to the form.

41. The combination with a form, of means for retaining a band-blank in vertical position, means for moving said blank sidewise in a horizontal direction to present it adjacent to the form, and for folding the blank to form a band and means for subsequently moving the band edgewise to its position on the form.

42. In a basket-making machine, the combination with a form, of means for holding a sheet of band-blank material in a horizontal position, means for turning one edge of the sheet to a vertical position, means for cutting a band-blank from the turned edge of the sheet, and means for moving said blank sidewise in a horizontal direction to present it adjacent to the form.

43. In a basket-making machine, the combination with the blank-bending mechanism for the basket-body, of means for cutting the individual bands from sheet material and a band-folder arranged to carry the bands away from the sheet to a proper position upon the basket-body.

44. In a basket-making machine, the combination with a blank-bending mechanism of a band-folder, a feeding mechanism for advancing the strip of sheet material to the folder, and a cutting mechanism intermediate of the folder and feeding mechanism.

45. In a basket-making machine, the combination with a band-folder, of mechanism for feeding a sheet of band-blank material to cause the engagement of its edge by the folder, and cutting mechanism located immediately adjacent to the band-folder to cut a band-blank from the sheet.

46. In a basket-making machine, the combination with the blank-bending mechanism, of a device for folding the band to the form of the basket to be made, and means for cutting the bands from sheet material subsequent to the engagement of the edge of such material by the folding device.

47. In a basket-making machine, the combination with the blank-bending mechanism, of a device for folding the bands to the form of the basket, a feeding mechanism for delivering sheet material to said device, and means for cutting the band from the sheet material while engaged with said folding device.

48. In a basket-making machine, the combination with body-blank-bending mechanism, of band-feeding mechanism for feeding a band into the zone of the blank-bending mechanism, said band-feeding mechanism comprising means for folding the band.

49. In a basket-making machine, the combination with body-blank-bending mechanism, of band-feeding mechanism for feeding a band into the zone of the blank-bending mechanism, said feeding mechanism comprising means for completely folding the band prior to its delivery to the basket.

50. In a basket-making machine, the combination with body-blank-bending mechanism, of mechanism located out of the zone of the bending mechanism for supplying band-blanks for the machine, and band-feeding mechanism for feeding the blanks into the zone of the bending mechanism, said feeding mechanism comprising a band-folder, and means for ejecting the band from the folder.

51. In a basket-making machine, the combination with a form and die for shaping a basket, of a device for folding a band to the form of the basket to be made, and means for carrying the band in its folded condition to its proper position with relation to the die and basket.

52. In a basket-making machine, the combination with blank-bending mechanism, and means for feeding bottom and sides forming blanks thereto, of means for folding a band to the form of the basket, and means for delivering the folded band to its proper position on the basket.

53. In a basket-making machine, the combination with the blank-bending mechanism, of a device for folding the band to the form of the basket to be made, and a movable support for said folding device to carry the same bodily toward and away from the plane of the bending mechanism.

54. In a basket-making machine, the combination with the blank-bending mechanism, of a folder for bending the band to the form of the basket, a movable support for bodily transporting the folder, and means for moving the support to carry the folder and band toward and the folder away from the plane of the bending mechanism.

55. In a basket-making machine, the combination with the blank-bending mechanism, of a folder for bending the band to the form of the basket to be made, and for supporting the band, a slide carrying said folder, and means for shifting the slide to move the folder bodily toward and away from the plane of the bending mechanism.

56. In a basket-making machine, the combination with the body-blank-bending mechanism, of a device for folding a band to the form of the basket to be made, said folding device also serving as a holder for the band during the folding operation, and a movable support to carry the band-folder bodily toward and away from the plane of the body-blank-bending mechanism, in addition to its function as a band-folder.

57. In a basket-making machine, the combination with blank-bending mechanism, of a band-folder, and a driver for removing the band from the folder to its proper position with relation to the bending mechanism.

58. In a basket-making machine, the combination with the blank-bending mechanism, of folders for the inner and outer bands, and means for moving said bands from the folders to their proper positions with respect to the bending mechanism.

59. In a basket-making machine, the combination with the blank-bending mechanism, of separate band-folding devices arranged in opposite relation, inner and outer band-feeding mechanisms associated respectively with the separate folding devices, and means for causing the synchronous operation of the said mechanisms.

60. In a basket-making machine, the combination with the blank-bending mechanism comprising a form and die, of a band-folder, and means for moving the band from the band-folder to its proper position on the form.

61. In a basket-making machine, the combination of a die, a band-folder, and a driver for dislodging the band from the folder and placing it in position with respect to the die.

62. In a basket-making machine, the combination with body-blank-bending mechanism for bending the body-blanks of a basket, of band-folding mechanism for simultaneously folding a pair of bands.

63. In a basket-making machine, the combination with the body-blank-bending mechanism for bending the body-blanks to the form of a basket, of means for simultaneously folding separate inner and outer bands and for applying said bands to a basket.

64. In a basket-making machine, the combination with the body-blank-bending mechanism for bending body-blanks to the form of a basket, of means for applying previously-folded inner and outer bands to the basket.

65. In a basket-making machine, the combination with body-blank-bending mechanism for bending body-blanks to the form of a basket, of means for folding separate inner and outer bands, and means for feeding the previously-formed bands in different directions to effect their presentation to the body-blanks.

66. In a basket-making machine, the combination of a die externally grooved, a band-folder provided with holders spaced apart, and a driver for dislodging the band from the folder, and comprising a series of strips or fingers adapted to move into the grooves of the die and having portions operating in the spaces formed between the aforesaid holders.

67. In a basket-making machine, the combination of a die externally grooved, a band-folder provided with holders spaced apart, and a driver, the latter comprising a series of fingers or strips having their end portions bent to project across the path of the band and operate in the grooves of the die and in the spaces formed between the said holders.

68. In a basket-making machine, the combination of a die, a band-retainer and guide surrounding the die, a band-folder, and a driver for dislodging the band from the folder and moving it into the space formed between the die and band-retainer.

69. In a basket-making machine, the combination of a die externally grooved, a band-retainer and guide surrounding the die and having spaces opposite the grooves of the die, and a driver for moving the band from the folder into the space formed between the die and band-retainer.

70. In a basket-making machine, the combination with a form, and a band-retainer encircling the form and provided with a series of tapering extensions, of a band-folder, and a driver for removing the band from the folder and forcing it into the space between the form and the surrounding extensions.

71. In a basket-making machine, the combination with the blank-bending mechanism, of a band-folder comprising a plurality of articulated members, and means for causing the members to be brought to a substantially alined position, and also swung upon their connections to fold the band into shape, and separate means for displacing and carrying the band in its shaped condition from said folder to the basket-body.

72. In a basket-making machine, the combination with the blank-bending mechanism, of a band-folder comprising a plurality of articulated members, and means for causing the said members to move to positions substantially at right angles to each other, and separate means for displacing and carrying the band in its shaped condition from said folder to the basket-body.

73. In a basket-making machine, the combination with the blank-bending mechanism, of a band-folder comprising back, side and front articulated members, means for causing the said members to move to positions substantially at right angles to each other, and separate means for displacing and carrying the band in its shaped condition from said folder to the basket-body.

74. In a basket-making machine, the combination with the blank-bending mechanism, of a band-folder consisting of a plurality of articulated members carrying holders for engaging the band, and means for displacing the band from said holders and carrying the same in its shaped condition to the basket-body.

75. In a basket-making machine, a band-folder comprising back, side and front articulated members, and connections between the front and back members, whereby the movement imparted to the side members will be transmitted to the front members.

76. In a basket-making machine, a band-folder comprising back, side and front plates hinged together, the front plates being about half the width of the back plate, and link connections between the front and back plates, whereby movement imparted to the side plates will be transmitted to the front plates.

77. A band-folder for basket-making machines, comprising back, side and front plates hinged together, extensions projecting from the back plate, projecting parts applied to the front plates, and links connecting the said extensions with the projecting parts of the front plates, whereby movement imparted to the side plates is transmitted to the front plates.

78. In a band-folder for basket-making machines, the combination of a series of plates hinged together and adapted when brought together to inclose a space, and a series of holders applied to the plates and having their extremities cleft to receive the band.

79. In a band-folder for basket-making machines, the combination of back, side and front plates hinged together and arranged to inclose a space, and holders applied to the said plates, and having their ends cleft to receive the band, the holders applied to the front plates being out of line to cause the ends of the band to overlap.

80. In a basket-making machine, the combination with a driver comprising a connected series of fingers having their free ends bent outwardly, of a series of plates hinged together and adapted when folded to inclose said driver, and holders applied to the plates and consisting of fingers having their free ends bent and cleft, the holders applied to the plates having angular motion, being offset between their ends.

81. In a basket-making machine, the combination of a slide bearing a band-folder, a rock-shaft journaled in bearings provided on the slide and having oppositely-extending arms, rods connecting the arms of the rock-shaft with elements of the band-folder to effect an opening and closing thereof, and links connecting other arms of the rock-shaft with a fixed part of the frame.

82. In a basket-making machine, the combination of a slide, a band-folder comprising a series of plates hinged together and having connection with the slide, a rock-shaft journaled in bearings provided on the slide and having a series of arms extending in opposite directions, rods connecting the side plates of the band-folder with some of the arms of the rock-shaft, links connecting other arms of the rock-shaft with a fixed part of the frame, and connections between the front plates of the band-folder and the rear plate.

83. In a basket-making machine, the combination of a form, a band-folder, a driver for driving the band from the folder to the form, a cam secured to a power-driven shaft, a pitman connecting the cam with the form and provided with guides and a slot, and a second pitman having connection with the driver and provided with a pin operating in the slot of the first-mentioned pitman and working in a groove of the cam and supported by a slide operating in the guides aforesaid.

84. In a basket-making machine, the combination of upper and lower band-feeding mechanisms, a sprocket-chain connecting corresponding elements of the two sets of feeding mechanisms for transmitting motion from one to the other, means for imparting movement to one of the feeding mechanisms and simultaneously operating band-folders coöperating with said feeding mechanisms.

85. In a basket-making machine, the combination of upper and lower band-feeders, band-folders for receiving the bands, upper and lower knives operating intermediate of the feeders and folders, links connecting the knives with a fixed part of the frame, a rock-shaft having oppositely-extending arms in connection with the said knives, and means for imparting a longitudinal movement to one of the knives.

86. In a basket-making machine, the combination of a cutter constructed to inclose a space, a head carrying the cutter, a bar pivoted to one end of a fixed support, a link connecting the pivoted bar at a point between its ends with the head carrying the cutter, and a clearer operating in the space inclosed by the cutter and having connection with the outer end of the pivoted bar and receiving a variable movement with respect to the cutter.

87. In a basket-making machine, the combination of two sets of feed-chains, a cross-head, plungers having connection with the cross-head, cutters attached to the said cross-head and inclosing a space, bars pivoted at their inner ends to a fixed part of the frame, links connecting the pivoted bars at a point between their ends with the aforesaid cross-head, and clearers operating in the spaces of the cutters and having connection with the outer ends of the pivoted bars.

88. In a basket-making machine, the combination of a reciprocating cutter for separating the stock into blanks, a bar pivoted to a fixed support, a link connecting the cutter with the pivoted bar at a point between its ends, a clearer, and means connecting the clearer with the outer end of the aforesaid pivoted bar at a point beyond the pivotal connection therewith of the aforesaid link.

89. In a basket-making machine, the combination with a die, and a surrounding band-retainer and guide, of springs extending across the space formed between the die and retainer.

90. In a basket-making machine, the combination of a female die, a band-retainer and guide surrounding the said die and projecting beyond one end thereof, and springs secured to the die and projecting across the space formed between the die and band-retainer to hold the band in place.

91. In a basket-making machine, the combination of a female die, a band-retainer and guide encircling the die and projecting beyond one end thereof, and springs located at the corners of the die and secured thereto and projecting across the space formed between the die and the band-retainer.

92. In a basket-making machine, the combination with a knife for trimming the sheet material, of a crimper coöperating therewith for spreading or disturbing the normal condition of the edges of abutting strips.

93. In a basket-making machine, the combination with a trimming-knife, of a crimper coöperating therewith, consisting of complementary parts provided with corresponding notches and projections.

94. A basket-making machine comprising a rotary table having a series of openings disposed in a circle, radial and tangential feeders for advancing the blanks, whereby the latter are received in the openings of the table in crossing relation, a cutting mechanism for dividing the strips of veneering into blanks of the required size, complementary dies for shaping the blanks into the required form, band-folders, drivers coöperating with the folders, and upper and lower band cutting and feeding mechanisms.

95. In a basket-making machine, the combination with the blank-bending mechanism, a horizontal bed having an opening in vertical alinement with the bending mechanism, a chute communicating with the bed at one side of the said opening therein, and a rotary table of annular form supported upon the bed and provided with a series of openings to receive and carry the blanks to the bending mechanism and the completed baskets to the chute, of radially and tangentially disposed feeders for supplying the blanks to the openings of the table, means for feeding, folding and applying the bands to the blanks when shaped, means for expelling the completed baskets, and actuating mechanism for the working parts.

96. In a basket-making machine, the combination with bending mechanism comprising a form and die, of means for feeding blanks to the bending mechanism, and band-feeding mechanism for feeding one band to the form and another to the die.

97. In a basket-making machine, the combination with bending mechanism, comprising a stationary die and a movable form, of blank-bending mechanism for feeding blanks to the bending mechanism, and band-feeding mechanism for feeding a band to the form and another to the die.

98. In a basket-making machine, the combination of blank-bending mechanism comprising a form and die one of which is movable, means for feeding bottom and sides forming blanks in crossed relation over or opposite the die, while the latter is separated from the form, means for actuating said bending mechanism to bend the blanks and to separate the form and die, and means for automatically applying a band about the movable element of the bending mechanism during the movement thereof.

99. In a basket-making machine, the combination with a bending mechanism comprising a form and die, means for feeding the body-forming blanks in properly-crossed relation over or opposite the die, means for reciprocating the form to and from the die, means for folding an inner band about the form in its excursion from and to the die, means for folding an outer band, and means for driving the folded band to its proper position as the form comes to rest in the die.

100. In a basket-making machine, the combination with basket-forming mechanism, of band-folding mechanism, and means for presenting the folded band to the basket-forming mechanism.

101. In a basket-making machine, the combination with basket-forming mechanism, of means for preparing properly-crossed blanks and folded bands for a succeeding basket during the formation of a basket by the basket-forming mechanism.

102. In a basket-making machine, the combination with the blank-bending mechanism, of blank-feeding mechanism for feeding blanks to the bending mechanism, means for folding inner and outer bands, and means for presenting the previously-folded bands to the basket.

103. In a basket-making machine, the combination with blank-bending mechanism, of mechanism for conveying and delivering the blanks thereto, said mechanism comprising means for causing said blanks while in transit to the bending mechanism to cross with their ends projecting beyond opposite sides of each other.

104. In a basket-making machine, the combination with a form and die, of blank-feeding mechanism for presenting blanks opposite the die, means for moving a folded inner band to its proper position as the form is moved, and means for moving a folded outer band to its position on the bent blanks.

105. In a basket-making machine, the combination with a folder having a passage therethrough, of a form and die normally located at opposite sides of the folder, said form being movable through the folder to initially bend the blanks and to present the partially-folded blanks to the die for the completion of the folding.

106. In a basket-making machine, the combination with a movable form, of a die, and an apertured plate arranged to coöperate with the form to fold the blanks prior to the delivery of said blanks to the die to complete the shaping of the basket.

107. In a basket-making machine, the combination with a movable form, of means for holding blanks in the path of the form, a folder, such as the edges of a hole formed in a plate, for folding the blanks toward the sides of the form as the form passes through said opening, and a die to receive the blanks carried forward by the form to cause said blanks to complete the shaping of the basket.

108. In a basket-making machine, the combination with a movable form, of a die, an apertured plate disposed intermediate of the form and die to constitute a folder for folding blanks toward the form as said blanks are carried toward the die, means for applying a band to the blanks, and means for uniting the band and blanks.

109. In a basket-making machine, the combination with a movable form, of a die, an apertured plate disposed intermediate of the form and die to constitute a folder for folding blanks toward the form as said blanks are carried toward the die, means for applying inner and outer bands to the blanks, and means for uniting the bands and blanks.

110. In a basket-making machine, the combination with a reciprocatory form, of means for holding blanks in the path of the form, a folder, such as the edges of a hole formed in a plate of the blanks-holding means, for folding the blanks toward the sides of the form as the form passes through said opening, a die to receive the blanks carried forward by the form to cause said blanks to complete the shaping of the basket, means for applying a band to the blanks, and means for uniting the band and blanks.

111. In a basket-making machine, the combination with a reciprocatory form, of means for holding blanks in the path of the form, a folder, such as the edges of a hole formed in a plate of the blank-holding means, for folding the blanks toward the sides of the form as the form passes through said opening, a die to receive the blanks carried forward by the form to cause said blanks to complete the shaping of the basket, means for applying inner and outer bands to the blanks, and means for uniting the bands and blanks.

112. In a basket-making machine, the combination with a form and die, of means for crossing two blanks with their ends projecting beyond the opposite sides of each other, said means including an apertured plate arranged to hold the blanks in position to be operated upon.

113. In a basket-making machine, the combination with a form, of means for crossing two blanks with their ends projecting beyond the opposite sides of each other, and means for folding said blanks about the form.

114. In a basket-making machine, the combination with a form and die, of means for crossing two blanks centrally of each other with their ends projecting and for holding them in a plane between the form and die.

115. In a basket-making machine, the combination with a form, of means for crossing a pair of blanks to cause them to project beyond two sides of each other, means for folding such blanks about the form, and means for applying a band to the blanks.

116. In a basket-making machine, the combination with a form, of means for crossing a pair of blanks to cause them to project beyond two sides of each other, means for folding such blanks about the form, and means for applying inner and outer bands to the blanks.

117. In a basket-making machine, the combination with a form and die having relative movement, of means for crossing a pair of blanks and for presenting the previously-crossed blanks between the form and die.

118. In a basket-making machine, the combination with a form and die having relative movement; of means for crossing a pair of blanks to project beyond each other on two sides and for simultaneously presenting the crossed blanks between the form and die to permit the bending of the blanks into the form of a basket, and means for applying a band around the edges of the blanks.

119. In a basket-making machine, the combination with a form and die having relative movement; of means for crossing a pair of blanks to project beyond each other on two sides and for presenting said blanks in crossed relation between the form and die to permit the bending of the blanks into the form of a basket, means for applying inner and outer bands around the edges of the blanks, and means for uniting the bands and blanks.

120. In a basket-making machine, the combination with a form, and die, of an intermediate apertured plate, and means for causing a pair of blanks to assume an angular relation opposite said aperture, whereby the edges of said aperture constitute a folder for folding the blanks toward the form as the latter passes through the opening in the plate.

121. In a basket-making machine, the combination with a form, and die, of an intermediate apertured plate, means for causing a pair of blanks to assume an angular relation opposite said aperture, whereby the edges of said aperture constitute a folder for folding the blanks toward the form as the latter passes through the opening in the plate, means for applying a band to the folded blanks, and means for uniting the band and blanks.

122. In a basket-making machine, the combination with a band-folder for bending a band into a shape corresponding to the shape of the basket to be formed, and a driver arranged to discharge the band from the folder.

123. In a basket-making machine, the combination with a band-folder for bending a band into a shape corresponding to the shape of the basket to be formed, means for feeding a band to the folder, and a driver arranged to take the band from the folder.

124. In a basket-making machine, the combination with a band-folder, of a movable form, means for transferring a previously-folded band from the band-folder to the form, and means for thereafter applying body-blanks to the form.

125. In a basket-making machine, the combination with a band-folder, of a form, means for transferring a previously-folded band from the folder to the form, means for applying body-blanks to the form, and means for uniting the band and blanks.

126. In a basket-making machine, the combination with a band-folder, of a form, means for transferring a previously-folded band from the folder to the form, means for applying body-blanks to the form, means for applying a second band to the blanks, and means for uniting the bands and blanks.

127. In a basket-making machine, the combination with blank-bending mechanism, of mechanism for advancing two blanks, and means for causing one blank to cross the other and for holding the crossed blanks until said blanks are engaged by the bending mechanism.

128. In a basket-making machine, the combination with a form and die having relative movement, of mechanism for advancing two blanks at a time, means for causing said blanks to cross each other, said means also serving to hold the crossed blanks during the relative movement of the form and die.

In testimony that I claim the foregoing as my own I have hereto affixed my signature in the presence of two witnesses.

HENRY W. SUMMER.

Witnesses:
JAMES M. SANOR,
DELMER O. EMMONS.